United States Patent
Elgaard et al.

(10) Patent No.: US 12,519,427 B2
(45) Date of Patent: Jan. 6, 2026

(54) ENVELOPE CONTROLLED BIASING OF AN AUXILIARY TRANSMITTER OF A DOHERTY POWER AMPLIFIER

(71) Applicant: Telefonaktiebolaget LM Ericsson (publ), Stockholm (SE)

(72) Inventors: Christian Elgaard, Lund (SE); Sven Mattisson, Lomma (SE); Stefan Andersson, Flyinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 560 days.

(21) Appl. No.: 17/923,989

(22) PCT Filed: May 14, 2020

(86) PCT No.: PCT/EP2020/063479
§ 371 (c)(1),
(2) Date: Nov. 8, 2022

(87) PCT Pub. No.: WO2021/228396
PCT Pub. Date: Nov. 18, 2021

(65) Prior Publication Data
US 2023/0179150 A1    Jun. 8, 2023

(51) Int. Cl.
H03F 1/02    (2006.01)
H03F 3/24    (2006.01)
H04B 1/04    (2006.01)

(52) U.S. Cl.
CPC ......... *H03F 1/0288* (2013.01); *H03F 1/0227* (2013.01); *H03F 3/245* (2013.01);
(Continued)

(58) Field of Classification Search
CPC ...... H03F 1/0288; H03F 1/0227; H03F 3/245; H03F 2200/102; H04B 1/0483; H04B 2001/0408
(Continued)

(56) References Cited

U.S. PATENT DOCUMENTS 7,619,468 B1    11/2009    Bowles et al.
10,027,354 B2 *   7/2018    Cohen ................... H04B 1/04
(Continued)

FOREIGN PATENT DOCUMENTS

CN    102165686 A    8/2011
CN    102893517 A    1/2013
(Continued)

OTHER PUBLICATIONS

International Search Report and Written Opinion dated Apr. 8, 2021 for International Application No. PCT/EP2020/063479 filed on May 14, 2020, consisting of 22 pages.
(Continued)

*Primary Examiner* — Hafizur Rahman
(74) *Attorney, Agent, or Firm* — Weisberg I.P. Law, P.A.

(57) ABSTRACT

A transmitter and Doherty power amplifier configured for envelope-controlled biasing of an auxiliary transmitter of the Doherty power amplifier are disclosed. According to one aspect, a transmitter having a main amplifier in a main signal path and an auxiliary amplifier in an auxiliary signal path is provided. The auxiliary amplifier is configured to be activated only when an envelope of an input signal of the transmitter exceeds a power threshold. The transmitter also includes at least one component in the auxiliary signal path configured to be deactivated when the auxiliary amplifier is deactivated, the at least one component including at least one of a pre-power amplifier, a mixer and a local oscillator buffer.

19 Claims, 8 Drawing Sheets

(52) U.S. Cl.
CPC ..... *H04B 1/0483* (2013.01); *H03F 2200/102* (2013.01); *H04B 2001/0408* (2013.01)

(58) Field of Classification Search
USPC ...................................................... 330/124 R
See application file for complete search history.

(56) References Cited

U.S. PATENT DOCUMENTS

| | | | |
|---|---|---|---|
| 2004/0174212 A1* | 9/2004 | Kim ...................... | H03F 1/0288 330/124 R |
| 2004/0263246 A1* | 12/2004 | Robinson .............. | H03F 1/0244 330/124 R |
| 2006/0293011 A1 | 12/2006 | Park et al. | |
| 2008/0111622 A1 | 5/2008 | Sperlich et al. | |
| 2012/0286861 A1 | 11/2012 | Bowles et al. | |
| 2017/0294951 A1 | 10/2017 | Weissman et al. | |
| 2018/0302042 A1* | 10/2018 | Zhang ..................... | H03F 3/602 |
| 2019/0379335 A1 | 12/2019 | Scott et al. | |
| 2024/0106467 A1* | 3/2024 | Keskin .................... | H03F 3/245 |

FOREIGN PATENT DOCUMENTS

| | | |
|---|---|---|
| CN | 107565908 A | 1/2018 |
| CN | 108206675 A | 6/2018 |
| EP | 2775609 A1 | 11/2012 |
| EP | 3340461 A1 | 6/2018 |
| WO | 01/95480 A1 | 12/2001 |
| WO | 2007078217 A1 | 7/2007 |
| WO | 2020143934 A1 | 7/2020 |
| WO | 2021259448 A1 | 12/2021 |

OTHER PUBLICATIONS

Nam, Kyu-Hyun et al., A 5.9 GHz DSRC Transmitter IC for Vehicle Wireless Communication System; 2018 International Conference on Electronics, Information and Communication (ICEIC), Institute of Electronics and Information Engineers; Jan. 24, 2018, consisting of 22 pages.

Jeong, Daechul et al., Ultra-Low Power Direct-Conversion 16 QAM Transmitter Based on Doherty Power Amplifier, IEEE Microwave and Wireless Components Letters, vol. 26, No. 7, Jun. 9, 2016, consisting of 3 pages.

Seth, Siddharth et al., A Dynamically Biased Multiband 2G/3G/4G Cellular Transmitter in 28 nm CMOS; IEEE Journal of Solid-State Circuits, vol. 51, No. 5, Jan. 26, 2016, consisting of 13 pages.

Shinjo, Shintaro et al., High Linearity SiGe-MMIC Q-MOD Having Self Mixer Current Control Circuit with Output Power Detector for 0.4-5.8 GHz Cognitive Radio Transceiver; IEEE Radio Frequency Integrated Circuits Symposium, Jun. 17, 2008, consisting of 4 pages.

Elgaard, Christian et al., A 27 GHz Adaptive Bias Variable Gain Power Amplifier and T/R Switch in 22nm FD-SOI CMOS for 5G Antenna Arrays; IEEE Radio Frequency Integrated Circuits Symposium; 2019, consisting of 4 pages.

Research Disclosure; Doherty amplifier with cooperative power tracking and bias adaption for high efficiency; The Industry Standard Disclosure Publication Service; May 10, 2012, consisting of 27 pages.

Shen, Yiyu et al., A Fully-Integrated Digital-Intensive Polar Doherty Transmitter; IEEE Radio Frequency Integrated Circuits Symposium, 2017, consisting of 4 pages.

Chinese Office Action and English Translation dated Dec. 30, 2024 for Application No. 202080100846.6, consisting of 18 pages.

European Communication Pursuant to Article 94(3) EPC issued in corresponding European Patent Application No. 20726096.9, dated Feb. 17, 2025, consisting of 8 pages.

\* cited by examiner

ENVELOPE CONTROLLED BIASING OF AN AUXILIARY TRANSMITTER OF A DOHERTY POWER AMPLIFIER

CROSS-REFERENCE TO RELATED APPLICATIONS

This application is a Submission Under 35 U.S.C. § 371 for U.S. National Stage Patent Application of International Application Number: PCT/EP2020/063479, filed May 14, 2020 entitled "ENVELOPE CONTROLLED BIASING OF AN AUXILIARY TRANSMITTER OF A DOHERTY POWER AMPLIFIER," the entirety of which is incorporated herein by reference.

TECHNICAL FIELD

Wireless communication and in particular, to envelope-controlled biasing of an auxiliary transmitter of a Doherty power amplifier.

BACKGROUND

Many radio systems, such as those that conform to Fourth Generation (4G, also called Long Term Evolution (LTE)) and Fifth Generation (5G, also called New Radio (NR)) standards promulgated by the $3^{rd}$ Generation Partnership Project (3GPP), use modulated signals having high peak to average ratio (PAR), with the drawback of low overall efficiency at average output power, and especially for the power amplifier. Methods exist that target improvements of overall efficiency when transmitting modulated signal with high PAR. One fundamental way, exploited by the Doherty Power Amplifier (DPA), is to use load modulation, to achieve a higher power added efficiency (PAE) at average output power.

Figure 1:
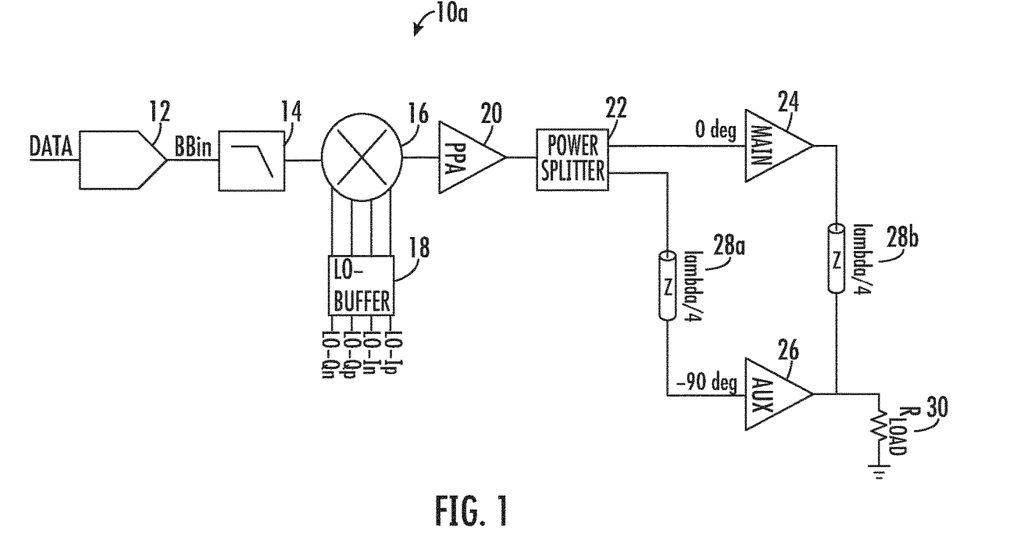
FIG. 1 is a block diagram of a known Doherty amplifier within a transmitter.

FIG. 1 is a block diagram of a standard DPA 10a. Baseband data, often in the form of in-phase and quadrature-phase signals, which may be converted from digital to analog form by the DAC 12, is filtered by a filter 14. The filtered baseband data is fed to a mixer 16, which mixes the filtered baseband data with a local oscillator (LO) signal fed to the mixer 16 via an LO buffer 18. The mixer 16 provides an upconverted signal to the pre-power amplifier (PPA) 20, which amplifies the signal from the mixer 16. The upconverted, amplified signal is fed to a power splitter 22, which splits the upconverted, amplified signal to a main path and an auxiliary path. In the main path is the main amplifier 24 and in the auxiliary path is the auxiliary amplifier 26. The signal input to the auxiliary amplifier 26 is phase shifted by 90+n*360 degrees (where n is an integer) by the impedance 28a. Phase shifting may be implemented by a λ/4 transmission line, where λ is the wavelength of a frequency of the signal input The output of the main amplifier 24 is also phase shifted by 90+m*360 degrees (where m is an integer) by the impedance 28b. The phase shifted signal is input to the auxiliary amplifier 26, which amplifies the signal. As the auxiliary amplifier amplifies its input signal it creates load modulation at the output of the main amplifier by impedance inversion through the impedance 28b, which may be a lambda/4 transmission line. The output of the auxiliary amplifier 26 is combined with signal from the impedance 28b and fed to a load 30.

Figure 2:
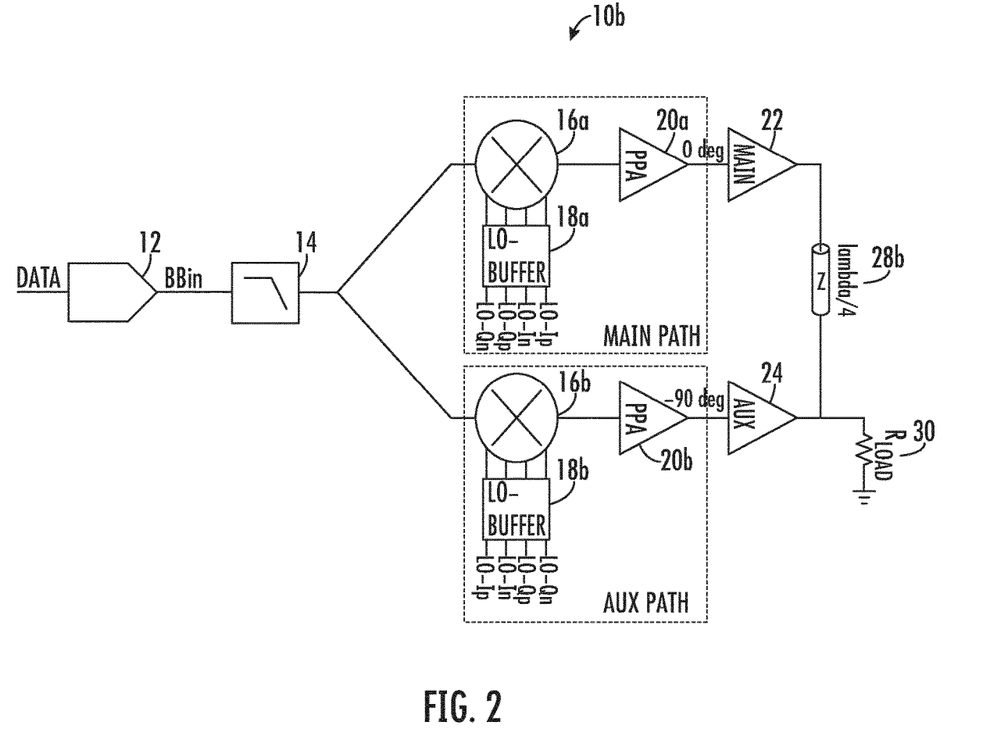
FIG. 2 is a block diagram of an alternative known Doherty amplifier within a transmitter.

As shown in FIG. 1, a standard DPA 10a uses two power amplifiers (PA) (main and auxiliary), driven by a power splitter and a 90-degree phase shifter for the auxiliary input. A known technique to produce the 90-degree phase shift is to use two mixers with phase shifted local oscillator (LO) signals to one of the two mixers as shown in FIG. 2. In FIG. 2, for DPA 10b, the filtered baseband signal is split into a main path and an auxiliary path. In the main path, the filtered baseband signal is mixed by mixer 16a with a LO signal from the LO buffer 18a, and in the auxiliary path, the filtered baseband signal is mixed by mixer 16b with an LO signal from the LO buffer 18b. The outputs of the mixers 16a and 16b are fed to pre-power amplifiers 20a and 20b, respectively.

For some cases, there are clear advantages to the architecture shown in FIG. 2 over that shown in FIG. 1. These advantages include an easily achieved 90-degree phase shift over a wider range of frequencies, no routing power loss in the power splitter, and no need to implement one of the lambda/4 transmission lines, which can consume valuable chip area. Another assumption when splitting up the mixer 16 and/or pre-power amplifier (PPA) 20 is that each mixer 16 and/or PPA 20 can be made to consume less power since each mixer 16 and/or PPA 20 only needs to deliver half the output power The DPA is used to improve efficiency when the output power of the transmitted signal is reduced as it uses load modulation to track the envelope of the modulated output signal. However, power consumption of the components preceding the PA remains constant even when the envelope goes down, which reduces the overall efficiency of the transmitter. This is a problem for systems with many antennas where each PA has low output power and lower efficiency, especially at very high frequencies

SUMMARY

Some embodiments advantageously provide a transmitter and Doherty amplifier for envelope-controlled biasing of an auxiliary transmitter of a Doherty power amplifier.

In some embodiments, power consumption is reduced in the components preceding the auxiliary amplifier, i.e., the auxiliary path as indicated in FIG. 2, by turning off these components for low output power. The power consumption of the preceding components in the auxiliary signal path can be reduced by controlling their respective bias levels with, for example, the base band (BB) envelope signal.

According to one aspect, a transmitter having a main amplifier in a main signal path and an auxiliary amplifier in an auxiliary signal path is provided. The auxiliary amplifier is configured to be activated only when an envelope of an input signal that is input to the transmitter exceeds a power threshold, the transmitter comprising. The transmitter also includes at least one component in the auxiliary signal path configured to be deactivated when the auxiliary amplifier is deactivated, the at least one component including at least one of a pre-power amplifier, a mixer and a local oscillator buffer.

According to this aspect, in some embodiments, the transmitter includes a comparator configured to compare the envelope signal to an envelope threshold, and a bias current controller to adjust a bias current of the at least one component to deactivate the at least one component when the envelope signal does not exceed the envelope threshold. In some embodiments, adjusting the bias current includes gradually decreasing or increasing the bias current with respect to the envelope signal. In some embodiments, the transmitter further includes a digital to analog converter, DAC, that is configured to be deactivated when the auxiliary amplifier is off. In some embodiments, the DAC is configured to generate the envelope signal. In some embodiments, the mixer in the auxiliary signal path receives the input signal and receives the envelope signal to provide adaptive bias to control the mixer. In some embodiments, an output of the mixer is input to the pre-power amplifier which also receives the envelope signal. In some embodiments, the transmitter also includes a local oscillator buffer configured to receive the envelope signal. In some embodiments, the pre-power amplifier receives the envelope signal, the envelope signal being used to adjust a gain of a pre-power amplifier, the adjusting tracking the envelope signal. In some embodiments, the pre-power amplifier, the mixer and the local oscillator buffer are each turned off separately in response to the envelope signal exceeding a different envelope threshold for each one of the pre-power amplifier, a mixer and a local oscillator buffer.

According to another aspect, a Doherty amplifier is provided. The Doherty amplifier includes a main amplifier in a main signal path, the main signal path configured to receive an input signal. The Doherty amplifier also includes an auxiliary amplifier in an auxiliary signal path, the auxiliary signal path having components including an envelope detector configured to detect an envelope of the input signal to produce an envelope signal and a mixer configured to mix the input signal with a local oscillator signal, the mixing being based at least in part on an adaptive bias provided by the envelope signal.

According to this aspect, the envelope detector includes a digital to analog converter, DAC. In some embodiments, the mixer is configured to receive the envelope signal to adaptively bias the mixer. In some embodiments, an output of the mixer is input to a pre-power amplifier which also receives the envelope signal. In some embodiments, the components in the auxiliary signal path include a pre-power amplifier configured to receive the envelope signal, the envelope signal being used to adjust a gain of the pre-power amplifier, the adjusting tracking the envelope signal. In some embodiments, the Doherty amplifier further includes, a bias current controller configured to adjust a bias current of at least one component in the auxiliary signal path to deactivate the components in the auxiliary signal path when the envelope signal does not exceed the envelope threshold. In some embodiments, adjusting the bias current includes gradually decreasing or increasing the bias current with respect to the envelope signal. In some embodiments, each component in the auxiliary signal path is deactivated separately in response to the envelope signal exceeding a different envelope threshold for each one of the components in the auxiliary signal path.

According to yet another aspect, a Doherty amplifier includes a filter configured to receive and filter an input signal to be amplified by the Doherty amplifier to produce a filtered input signal, and a splitter circuitry to split the filtered input signal into a main signal path and an auxiliary signal path. In the main signal path, a first mixer is configured to mix the filtered input signal with a local oscillator signal to produce a first mixer output signal. A first pre-power amplifier is configured to receive and amplify the first mixer output signal to produce a main amplifier input signal. The Doherty amplifier further includes the main amplifier and in the auxiliary path, a second mixer is configured to mix the filtered input signal with the local oscillator signal to produce a second mixer output signal, the second mixer being activated and deactivated by an envelope of the input signal. A second pre-power amplifier is configured to receive and amplify the second mixer output signal to produce an auxiliary amplifier input signal, the second pre-power amplifier being activated and deactivated by the envelope of the auxiliary amplifier input signal. The Doherty amplifier further includes the auxiliary amplifier. In some embodiments, the Doherty amplifier further includes a local oscillator buffer configured to buffer the local oscillator signal, the local oscillator buffer being activated and deactivated by the envelope of the amplifier input signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to envelope-controlled biasing of an auxiliary transmitter of a Doherty power amplifier. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Some embodiments provide envelope-controlled biasing of an auxiliary transmitter of a Doherty power amplifier.

Figure 3:
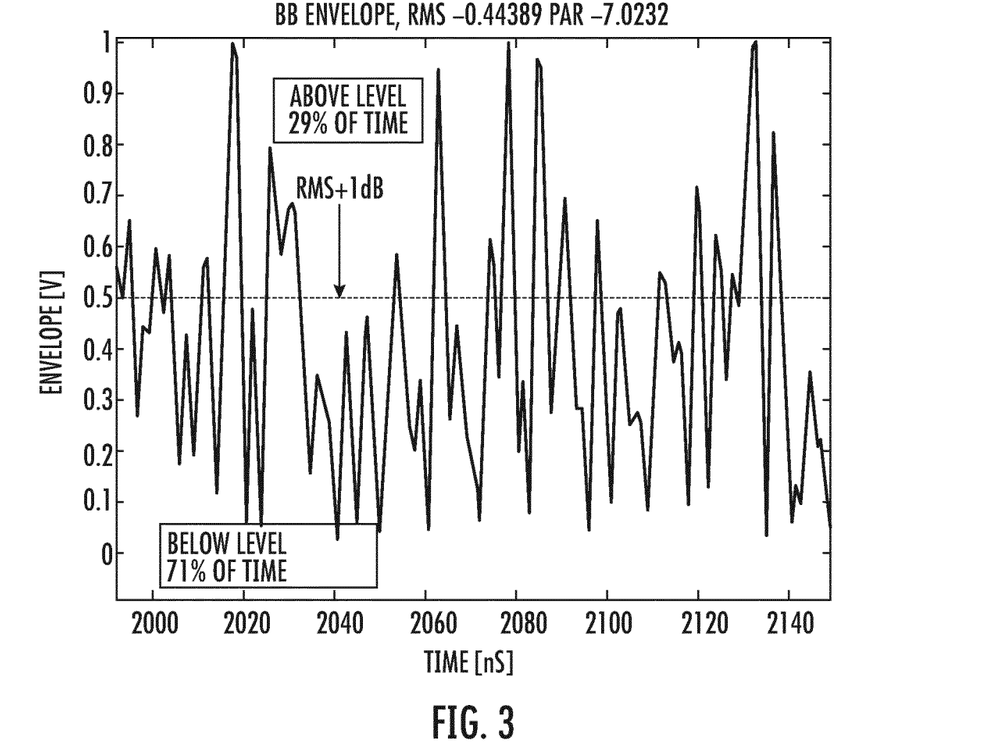
FIG. 3 is a graph of a baseband envelope.

An example of a baseband envelope is shown in FIG. 3. In the example of FIG. 3, the baseband envelope is below the RMS +1 dB level 71% of the time. When the envelope of a modulated signal is low, the auxiliary amplifier in the DPA is effectively turned off. This means that power can be saved by also turning of the components in the auxiliary path. The components in the auxiliary path should always be turned on when the auxiliary amplifier is turned on, i.e., to guarantee that the input signal to the auxiliary amplifier is present when it turns on. This means that the components in the auxiliary path should be turned on at a lower power level than the auxiliary power amplifier. The lower this level is, the shorter time these components may be turned off. Hence, the power savings will be reduced with lower turn on level.

A symmetric DPA is ideally turned on at max Pout−6 dB. Using this setting gives an upper limit of the maximum time that the auxiliary path can be turned off as shown in FIG. 4.

Figure 4:
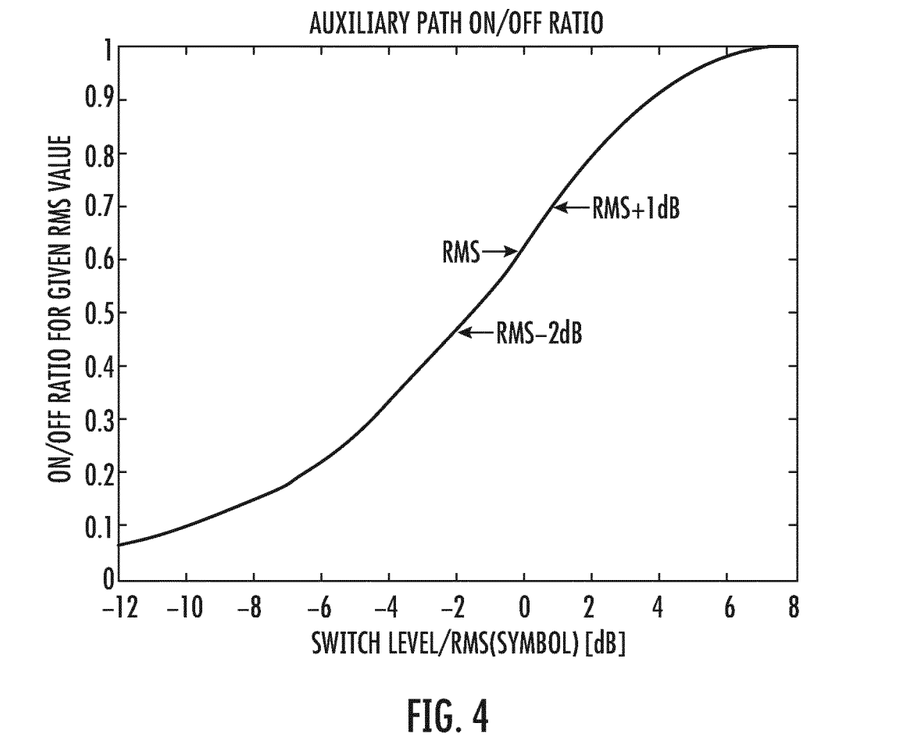
FIG. 4 is a graph of an example of upper limit of the maximum time that the auxiliary path can be turned off.

Adding an arbitrarily chosen 3 dB margin for turning the auxiliary path on or off when using the symmetrical DPA, gives a root mean squared (RMS) level of −2 dB at 47%, as shown in FIG. 4. This means that the PPA, mixer and LO-Buffer in the auxiliary path as shown in FIG. 2 can be turned off 47% of the time.

Figure 5:
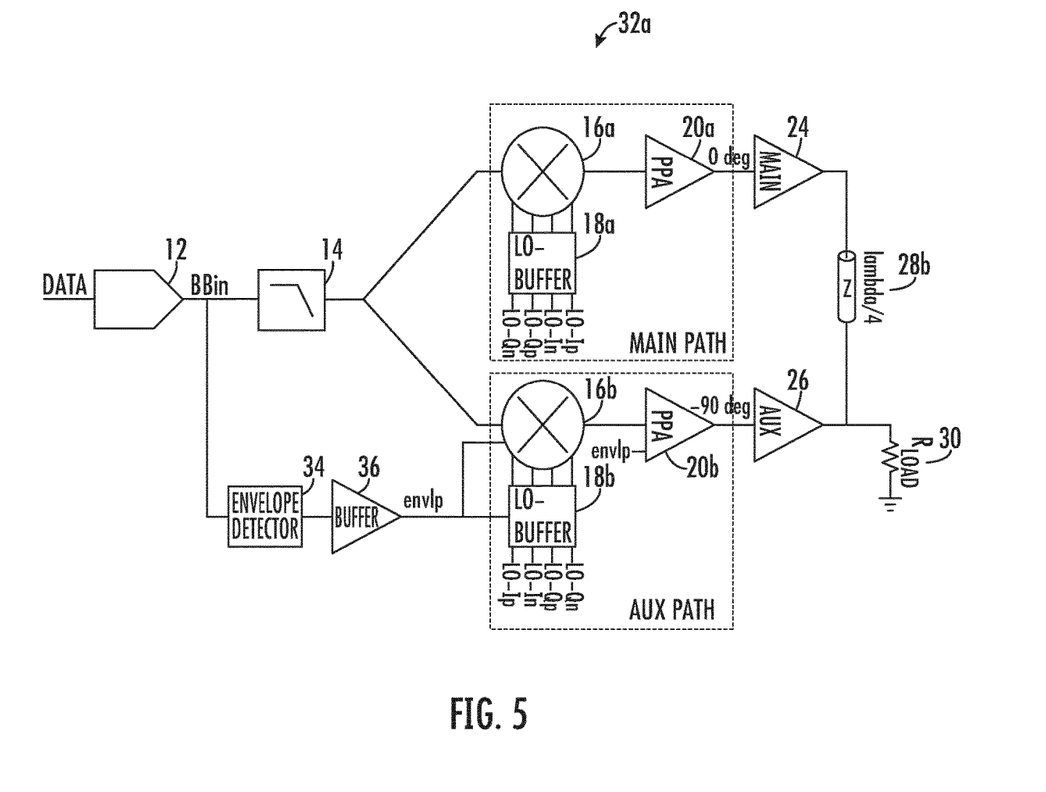
FIG. 5 is a block diagram of an exemplary implementation of a transmitter constructed in accordance with principles set forth herein.
Figure 6:
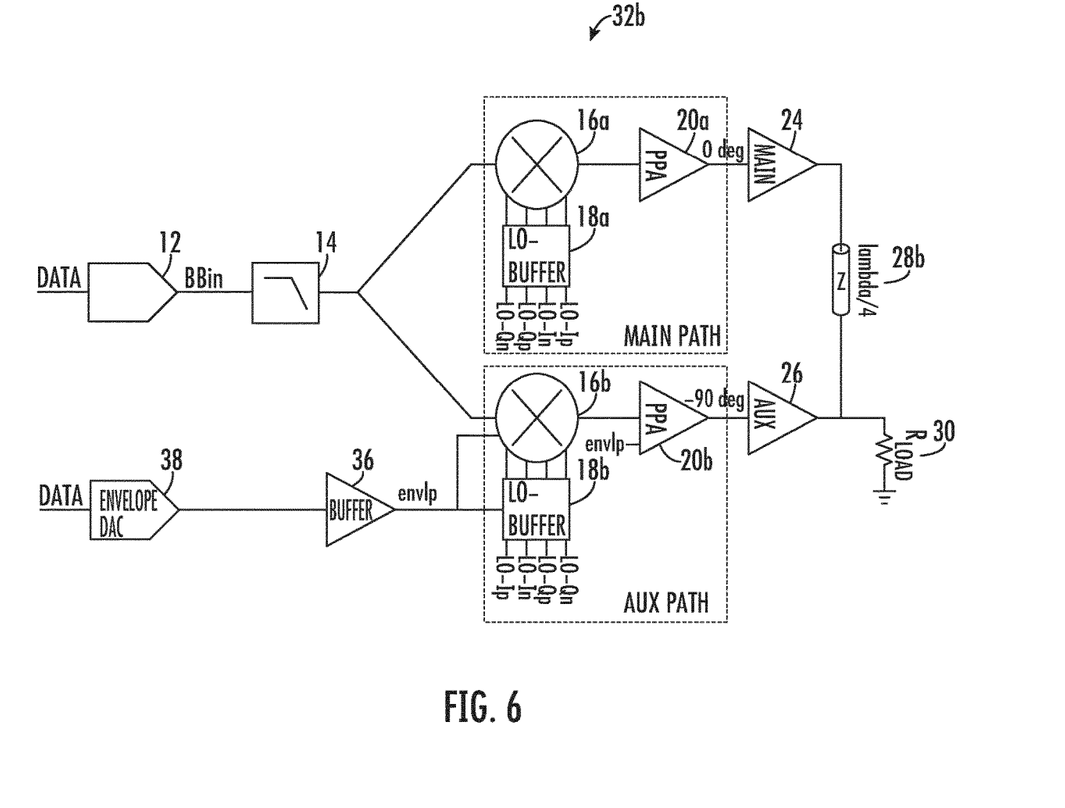
FIG. 6 is a block diagram of an alternative exemplary implementation of a transmitter constructed in accordance with principles set forth herein.

FIGS. 5 and 6 are diagrams showing two example DPA transmitter architectures 32a (FIG. 5) and 32b (FIG. 6) constructed in accordance with the disclosure herein. These architectures provide the ability to control the bias current of one or more of the components (mixer 16b, LO-buffer 18b and PPA 20b) in the auxiliary path, as indicated in FIGS. 5 and 6. The mixer 16b, the LO-buffer 18b and the PPA 20b, can be any one of a number of known (or to be developed) mixers, LO-buffers and PPAs, respectively, but which are modified individually or as part of or all of a group to be deactivated, i.e., powered off, when the envelope signal falls below one or more thresholds, for example by adding comparators as explained below.

The term "envelope signal" is used to characterize a signal that may be based on the smooth curve outlining the extreme values of a signal. For a complex signal, the envelope signal for the positive and negative extremes may be different. The envelope signal can be generated by known methods or methods to be developed. Such methods for generating the envelope signal may include rectification or squaring. Several nonlinear operations can also be used to derive an envelope signal. Further, the envelope does not have to be a linear mapping to the signal's instantaneous amplitude; a monotonic mapping may suffice. For example, taking the square of the input signal results in an envelope that tracks the instantaneous signal power. As the square is a smooth and monotonic mapping, the square of the signal can be used as a representation of the envelope signal. The envelope signal may also be subject to filtering to suppress unwanted spectral components or to enhance parts of the envelope. Thus, as used herein, the term "envelope signal," encompasses envelope signals generated by any known methods or methods to be developed. The term "envelope," refers to the curve outlining the extreme values of the input signal.

Figure 7:
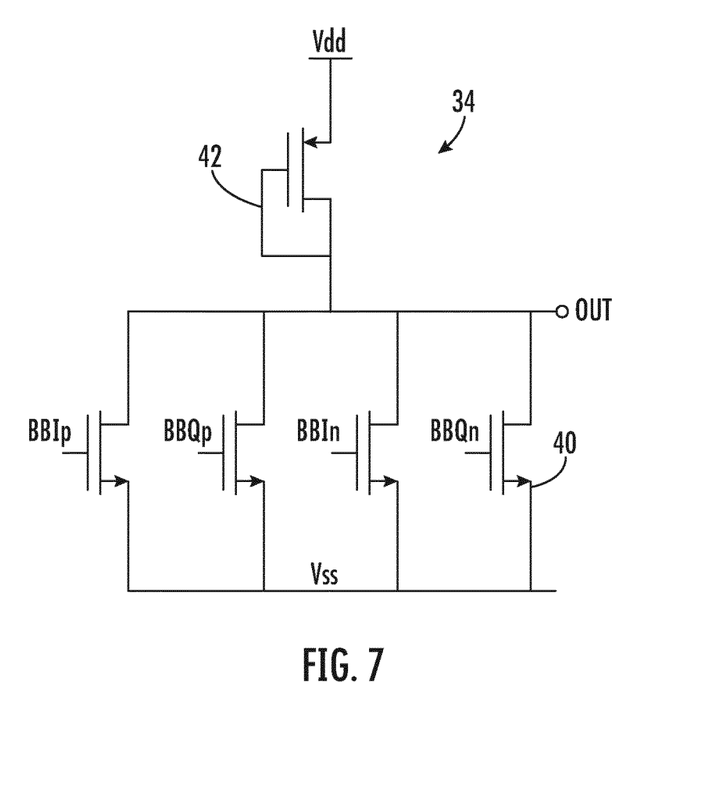
FIG. 7 is a schematic of a baseband envelope detector.

In the example of FIG. 5, the envelope signal is produced from the baseband input signal using an envelope detector 34 approximating the function $\sqrt{I^2+Q^2}$. The output of the envelope detector 34 is fed to a buffer 36 that distributes the envelope signal to the components in the auxiliary path that are to be controlled. One possible implementation of the baseband envelope detector 34 is shown in FIG. 7. The envelope detector 34 circuit of FIG. 7 includes transistors 40 and 42, the transistors 40 receiving I and Q base band signals produce the approximating function $\sqrt{I^2+Q^2}$. There are many possible ways to reduce the power consumption in the components, but a straightforward way is to use a comparator and when the envelope signal falls below a certain threshold level, the bias current from the buffer 36 that is input to the mixer 16b may be turned off. For envelope levels above the threshold level, the bias may be set to be turned on. Another solution includes gradually decreasing or increasing the bias current with respect to the envelope signal. In the example of FIG. 6, the envelope signal is received directly from the digital baseband through a dedicated envelope digital to analog converter (DAC) 38. The specification of the dedicated envelope DAC 38 may be constructed with fewer bits than the DAC producing the IQ input signals.

The rise and fall times of the bias signal will depend on the envelope signal's bandwidth. A slow bias network will require more margin to the auxiliary power amplifier turn-on threshold and, consequently, limit the power saving potential. This can partly be compensated for by adding time-delays along the signal path, where the time delays can be implemented by wires, all-pass filters and other known techniques. The bias threshold, or thresholds, can be tuned with the bias response speed to optimize performance Simulation Results A schematic design in 22 nm fully depleted silicon on insulator (FD-SOI) process of a DPA based on the DPA transmitter architectures 32a and 32b operating at 22 GHz was implemented using individual mixers 16a and 16b for the main and auxiliary paths to produce the 90-degree phase difference. The auxiliary amplifier 26 was turned on at about 6 dB below a maximum output power and the auxiliary path was configured to turn on at 9 dB below maximum output power, i.e., configured using the 3 dB margin as explained above. The envelope detector 34 was designed to operate at the baseband input signal, thereby producing an output signal that controls when the auxiliary path is on or off. For demonstration purposes all the auxiliary components, including components 16b, 18b and 20b, were turned on at the same envelope level. However, the auxiliary components can be configured to be turned on at individual levels, to minimize power consumption. For simplicity the LO-Buffers 18b were not controlled with the envelope signal in one simulation.

Figure 8:
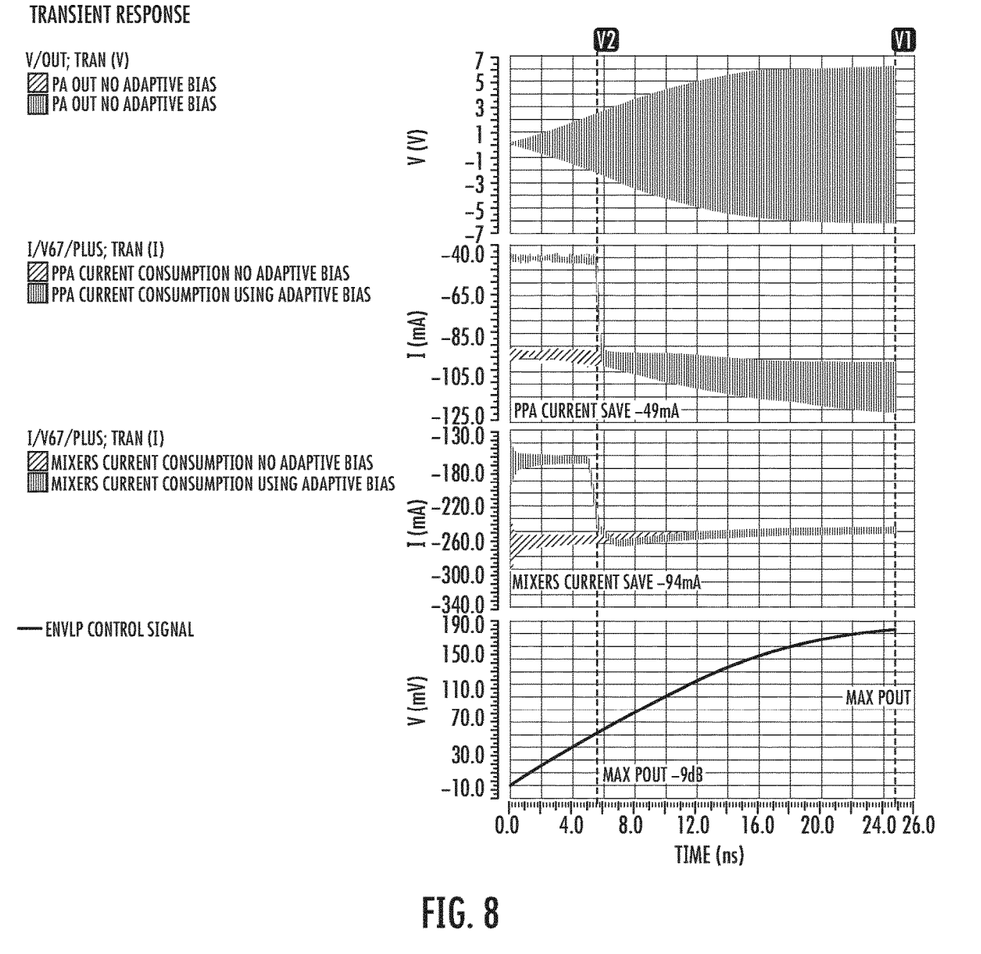
FIG. 8 illustrates performance of an implementation of a Doherty amplifier according to principles disclosed herein.

Simulation results are shown in FIG. 8. Referring to FIG. 8, the simulated transmitter based on DPA transmitter 32a, 32b produces close to identical output signals with and without using adaptive bias on the components in the auxiliary path. For this particular example the PPA (1.2 Volt power supply) and the mixer (0.8 Volt power supply) saves 60 milli-Watts (mW)+75 mW=135 mW when turned off. These numbers should then be multiplied by the time average of 47%, that the orthogonal frequency division multiplexed (OFDM) signal is below the maximum output power (Pout) −9 dB threshold, resulting in an average power save of 63 mW.

This particular transmitter based on DPA transmitter 32a, 32b has a simulated output power at Pavg (7 dB back off) at 87 mW (19.4 dBm) with a power added efficiency (PAE) of 33%, which results in a power consumption for the DPA of 264 mW. The total transmitter PAE at Pavg is 14.8%, which results in a power consumption for the complete transmitter chain of 588 mW. From the calculation above, the average power saved by using the proposed technique will be 135 mW×47%=63 mW, which should be set in comparison with the transmit power consumption of 588 mW at Pavg.

When using two individual mixers to create the 90-degree phase shift at the input of a DPA, at least one of the components preceding the auxiliary amplifier (PPA 20, mixer 16b and LO-buffers 18b) of the DPA are turned off for output power levels when the auxiliary amplifier 26 is effectively turned off. This results in power savings and increases the overall transmitter efficiency for lower output powers. The amplitude of the envelope of the modulated OFDM signal output by the envelope detector 34, 38 is used to control when the components in the auxiliary path is turned off. Any one or more of the auxiliary components, including mixer 16b, LO buffer 18b and PPA 20b, can be turned off in order to optimize power consumption without deteriorating the wanted output signal.

According to one aspect, a DPA transmitter 32a, 32b, having a main amplifier 24 in a main signal path and an auxiliary amplifier 26 in an auxiliary signal path is provided. The auxiliary amplifier 26 is configured to be activated only when an envelope of an input signal that is input to the DPA transmitter 32a, 32b, exceeds a power threshold. The DPA transmitter 32a, 32b, also includes at least one component in the auxiliary signal path configured to be deactivated when the auxiliary amplifier 26 is deactivated, the at least one component including at least one of a pre-power amplifier 20b, a mixer 16b and a local oscillator buffer 18b.

According to this aspect, in some embodiments, the DPA transmitter 32a, 32b, includes a comparator configured to compare the envelope signal to an envelope threshold, and a bias current controller to adjust a bias current of the at least one component to deactivate the at least one component when the envelope signal does not exceed the envelope threshold. The comparator and bias current controller act upon the signal from the buffer 36 to control the bias current to the mixer 16b. In some embodiments, adjusting the bias current includes gradually decreasing or increasing the bias current with respect to the envelope signal. In some embodiments, the DPA transmitter 32a, 32b, is further includes a digital to analog converter, DAC, 38 that is configured to be deactivated when the auxiliary amplifier 26 is off. In some embodiments, the envelope DAC 38 is configured to generate the envelope signal. In some embodiments, the mixer 16b in the auxiliary signal path receives the input signal and receives the envelope signal to provide adaptive bias to control the mixer 16b. In some embodiments, an output of the mixer 16b is input to the pre-power amplifier 20b which also receives the envelope signal. In some embodiments, the DPA transmitter 32a, 32b, also includes a local oscillator buffer 18b configured to receive the envelope signal. In some embodiments, the pre-power amplifier 20b receives the envelope signal, the envelope signal being used to adjust a gain of a pre-power amplifier 20b, the adjusting tracking the envelope signal. In some embodiments, the pre-power amplifier 20b, the mixer 16b and the local oscillator buffer 18b are each turned off separately in response to the envelope signal exceeding a different envelope threshold for each one of the pre-power amplifier 20b, the mixer 16b and a local oscillator buffer 18b.

According to another aspect, a Doherty amplifier 32a, 32b is provided. The Doherty amplifier 32a, 32b, includes a main amplifier 24 in a main signal path, the main signal path configured to receive an input signal. The Doherty amplifier 32a, 32b, also includes an auxiliary amplifier 26 in an auxiliary signal path, the auxiliary signal path having components including an envelope detector 34, 38 configured to detect an envelope of the input signal to produce an envelope signal and a mixer 16b configured to mix the input signal with a local oscillator signal, the mixing being based at least in part on an adaptive bias provided by the envelope signal.

According to this aspect, the envelope detector 34, 38 includes a digital to analog converter, DAC. In some embodiments, the mixer 16b is configured to receive the envelope signal to adaptively bias the mixer 16b. In some embodiments, an output of the mixer 16b is input to a pre-power amplifier 20b which also receives the envelope signal. In some embodiments, the components in the auxiliary signal path include a pre-power amplifier 20b configured to receive the envelope signal, the envelope signal being used to adjust a gain of the pre-power amplifier 20b, the adjusting tracking the envelope signal. In some embodiments, the Doherty amplifier 32a, 32b further includes, a bias current controller within the buffer 36, the bias current controller is configured to adjust a bias current of at least one component in the auxiliary signal path to deactivate the components in the auxiliary signal path when the envelope signal does not exceed the envelope threshold. In some embodiments, adjusting the bias current includes gradually decreasing or increasing the bias current with respect to the envelope signal. In some embodiments, each component in the auxiliary signal path is deactivated separately in response to the envelope signal exceeding a different envelope threshold for each one of the components in the auxiliary signal path.

According to yet another aspect, a Doherty amplifier 32a, 32b, includes a filter 14 configured to receive and filter an input signal to be amplified by the Doherty amplifier 32a, 32b to produce a filtered input signal, and splitter circuitry to split the filtered input signal into a main signal path and an auxiliary signal path. In the main signal path, a first mixer 16a is configured to mix the filtered input signal with a local oscillator signal to produce a first mixer output signal. A first pre-power amplifier 20a is configured to receive and amplify the first mixer output signal to produce a main amplifier input signal. The Doherty amplifier 32a, 32b further includes the main amplifier 24 and in the auxiliary path, a second mixer 16b is configured to mix the filtered input signal with the local oscillator signal to produce a second mixer output signal, the second mixer being activated and deactivated by an envelope of the main amplifier input signal. A second pre-power amplifier 20b is configured to receive and amplify the second mixer output signal to produce an auxiliary amplifier input signal, the second pre-power amplifier being activated and deactivated by the envelope of the auxiliary amplifier input signal. The Doherty amplifier 32a, 32b further includes the auxiliary amplifier 26. In some embodiments, the Doherty amplifier further includes a local oscillator buffer 18a, 18b configured to buffer the local oscillator signal, the local oscillator buffer being activated and deactivated by the envelope of the amplifier input signal.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations used herein are as follows:

| Abbreviation | Explanation |
| --- | --- |
| DPA | Doherty Power Amplifier |
| LO-Buffer | Local Oscillator Buffer |
| OFDM | Orthogonal Frequency Division Multiplexing |
| PA | Power Amplifier |
| PPA | Pre-Power Amplifier |
| Psat | Saturated Output Power |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A transmitter having a main amplifier in a main signal path and an auxiliary amplifier in an auxiliary signal path, the auxiliary amplifier configured to be activated only when an envelope of an input signal that is input to the transmitter exceeds a power threshold, the transmitter comprising:
   at least one component in the auxiliary signal path configured to be deactivated when the auxiliary amplifier is deactivated, the at least one component including at least one of a pre-power amplifier, a mixer and a local oscillator buffer; and
   a digital to analog converter, DAC, that is configured to be deactivated when the auxiliary amplifier is off.

2. The transmitter of claim 1, further comprising:
   a comparator configured to compare the envelope signal to an envelope threshold; and
   a bias current controller to adjust a bias current of the at least one component to deactivate the at least one component when the envelope signal does not exceed the envelope threshold.

3. The transmitter of claim 2, wherein adjusting the bias current includes gradually decreasing or increasing the bias current with respect to the envelope signal.

4. A Doherty amplifier, comprising:
   a filter configured to receive and filter an input signal to be amplified by the Doherty amplifier to produce a filtered input signal;
   splitter circuitry to split the filtered input signal into a main signal path and an auxiliary signal path;
   in the main signal path:
      a first mixer configured to mix the filtered input signal with a local oscillator signal to produce a first mixer output signal;
      a first pre-power amplifier configured to receive and amplify the first mixer output signal to produce a main amplifier input signal; and
      the main amplifier; and
   in the auxiliary signal path:
      a second mixer configured to mix the filtered input signal with the local oscillator signal to produce a second mixer output signal, the second mixer being activated and deactivated by an envelope of the main amplifier input signal;
      a second pre-power amplifier configured to receive and amplify the second mixer output signal to produce an auxiliary amplifier input signal, the second pre-power amplifier being activated and deactivated by the envelope of the auxiliary amplifier input signal; and
      the auxiliary amplifier.

5. The transmitter of claim 1, wherein the DAC is configured to generate the envelope signal.

6. A transmitter having a main amplifier in a main signal path and an auxiliary amplifier in an auxiliary signal path, the auxiliary amplifier configured to be activated only when an envelope of an input signal that is input to the transmitter exceeds a power threshold, the transmitter comprising:
   at least one component in the auxiliary signal path configured to be deactivated when the auxiliary amplifier is deactivated, the at least one component including at least one of a pre-power amplifier, a mixer and a local oscillator buffer, the mixer in the auxiliary signal path receiving the input signal and receiving the envelope signal to provide adaptive bias to control the mixer.

7. The transmitter of claim 6, wherein an output of the mixer is input to the pre-power amplifier which also receives the envelope signal.

8. The transmitter of claim 6, further comprising a local oscillator buffer configured to receive the envelope signal.

9. The transmitter of claim 1, wherein the pre-power amplifier receives the envelope signal, the envelope signal being used to adjust a gain of a pre-power amplifier, the adjusting tracking the envelope signal.

10. The transmitter of claim 1, wherein the pre-power amplifier, the mixer and the local oscillator buffer are each turned off separately in response to the envelope signal exceeding a different envelope threshold for each one of the pre-power amplifier, a mixer and a local oscillator buffer.

11. A Doherty amplifier, comprising:
    a main amplifier in a main signal path, the main signal path configured to receive an input signal; and
    an auxiliary amplifier in an auxiliary signal path, the auxiliary signal path having components including an envelope detector configured to detect an envelope of the input signal to produce an envelope signal and a mixer configured to mix the input signal with a local oscillator signal, the mixing being based at least in part on an adaptive bias provided by the envelope signal.

12. The Doherty amplifier of claim 11, wherein the envelope detector includes a digital to analog converter, DAC.

13. The Doherty amplifier of claim 11, wherein the mixer is configured to receive the envelope signal to adaptively bias the mixer.

14. The Doherty amplifier of claim 13, wherein an output of the mixer is input to a pre-power amplifier which also receives the envelope signal.

15. The Doherty amplifier of claim 11, wherein the components in the auxiliary signal path include a pre-power amplifier configured to receive the envelope signal, the envelope signal being used to adjust a gain of the pre-power amplifier, the adjusting tracking the envelope signal.

16. The Doherty amplifier of claim 11, further comprising a bias current controller configured to adjust a bias current of at least one component in the auxiliary signal path to deactivate the components in the auxiliary signal path when the envelope signal does not exceed the envelope threshold.

17. The Doherty amplifier of claim 15, wherein adjusting the bias current includes gradually decreasing or increasing the bias current with respect to the envelope signal.

18. The Doherty amplifier of claim 11, wherein each component in the auxiliary signal path is deactivated separately in response to the envelope signal exceeding a different envelope threshold for each one of the components in the auxiliary signal path.

19. The Doherty amplifier of claim 4, further comprising a local oscillator buffer configured to buffer the local oscillator signal, the local oscillator buffer being activated and deactivated by the envelope of the pre-power amplifier input signal.

* * * * *